Jan. 13, 1959 G. D. DOLAND 2,868,871

RECEIVER COLOR PRIMARY TRANSFORMATION SYSTEM

Filed April 21, 1953 3 Sheets-Sheet 1

INVENTOR.
GEORGE D. DOLAND

BY Allen V. Hazeltine

ATTORNEY

Jan. 13, 1959 G. D. DOLAND 2,868,871

RECEIVER COLOR PRIMARY TRANSFORMATION SYSTEM

Filed April 21, 1953 3 Sheets-Sheet 2

INVENTOR.
GEORGE D. DOLAND

BY

[signature]
ATTORNEY

INVENTOR.
GEORGE D. DOLAND
BY
Dean V. Hazeltine
ATTORNEY 2,868,871

RECEIVER COLOR PRIMARY TRANSFORMATION SYSTEM

George D. Doland, Philadelphia, Pa., assignor to Philco Corporation, Philadelphia, Pa., a corporation of Pennsylvania Application April 21, 1953, Serial No. 350,089

10 Claims. (Cl. 178—5.4)

The present invention relates to television receiving systems and more particularly to color television receiving systems for reproducing image information which is in the form of a video color wave having a first component definitive of the brightness of the image to be reproduced, and a second component definitive of the chromaticity of the image to be reproduced.

To produce a video color wave of the foregoing type, there may be derived at the transmitter, by means of appropriate camera units, three signals indicative of three color-specifying parameters of successively scanned elements of a televised scene. These three signals are preferably such as to specify the image colors with respect to three imaginary color primaries "X," "Y" and "Z," in accordance with the principles set forth in the copending application of Frank J. Bingley, Serial No. 225,567, filed May 10, 1951. As described in that application, with this choice of primaries, the Y signal represents the brightness of the image elements as perceived by the human eye and is made proportional to the energy distribution of the light emitted by the image as weighted by a color mixture curve having a shape and ordinate scale substantially identical to the shape and ordinate scale of the curve of the relative luminosities of the spectral colors to the eye.

The X and Z signals containing the remaining intelligence as to the color of the image elements are made proportional respectively to the energy distribution of the light emitted by the image elements as weighted by second and third color mixture curves having shapes and ordinate scales complementing the shape and ordinate scale of the first curve. In a preferred arrangement described in the said Bingley application, the X and Z signals are made proportional to the imaginary color primaries X and Z defined by the International Commission on Illumination (ICI), under which conditions the transmission of the X, Y and Z signals makes available at the receiver all of the required information necessary to properly excite the three real primary color sources of the image reproducing cathode-ray tube.

In a preferred arrangement for segregating and apportioning the intelligence concerning the X, Y and Z components of the color image at the transmitter, these components are combined to form two difference signals (X—Y) and (Z—Y) which are modulated in separate carrier components having the same frequency and phase displaced relative to each other. By then combining the so modulated carrier components a resultant subcarrier having phase and amplitude variations may be produced. The Y signal is then transmitted in the frequency band located below that of the modulated subcarrier. The modulation of the subcarrier is preferably effected by means of balanced modulators, so that no subcarrier signal is generated when the difference signals (X—Y) and (Z—Y) are zero, i. e. when image elements which are white or gray are scanned. However, when colored image elements are scanned, either or both of the difference signals (X—Y) and (Z—Y) will differ from zero, producing a subcarrier signal having a phase determined by the relative values of the difference signals and hence by the hue of the image elements, and an amplitude determined by the absolute values of the difference signals and hence by the saturation of the color of the image elements. The modulated subcarrier signal therefore may be considered as a chromaticity signal having a phase and amplitude representative of the hue and saturation respectively of the color of the image elements.

In a modification of the above described method of producing the chromaticity signal, the camera system at the transmitter may be constructed to produce two color difference signals "I" and "Q" which are transmitted as amplitude modulations of two carrier components in quadrature, thereby to produce a resultant subcarrier signal in the manner above discussed in connection with the (X—Y) and (Z—Y) signals. The I signal may be constructed to represent changes of the chromaticity of the image elements along the orange-cyan axis of the chromaticity diagram and, in a typical arrangement, may be a relatively wide band signal. The Q signal may be constructed to represent changes of the chromaticity of the image elements along an axis substantially in quadrature to the orange-cyan axis i. e. along the magenta-green axis of the chromaticity diagram and, in a typical arrangement, may be a relatively narrow band signal.

Alternatively, the three signals indicative of the three color specifying parameters of the televised scene may be such as to specify the brightness and chromaticity of the image in terms of the primary colors of a specific primary color system. More particularly, a wide band signal approximately proportional to the brightness of a televised scene, hereinafter to be referred to as "M," may be generated by combining three signals proportional to specific red, green and blue primary color components of the colors of successively scanned image elements. Such a signal may have a value determined by $$\frac{R+G+B}{3}$$

where R, G and B represent the intensities of the red, green and blue primary color components of the successively scanned image elements. Two additional narrow band signals N and O, complementary to M and defining with the signal M the color of the image elements, may be generated by appropriately combining the R, G and B signals. In a preferred arrangement at the transmitter, the M, N and O components are combined to form two narrow band difference signals (N—M) and (O—M) which respectively are transmitted as amplitude modulation of two carrier components phase displaced relative to each other and thereafter combined to produce a phase and amplitude modulated subcarrier in a manner similar to that above described.

It will be seen that, in each of the instances above described, the color video wave comprises a first component of relatively wide bandwidth defining the brightness of the consecutively scanned image elements, and further comprises a second component in the form of a modulated subcarrier arranged at one end of the frequency spectrum of the first component and defining, with the first component, the chromaticity of the image elements. In a typical case the first component may have a frequency spectrum extending from 0 to 3.5 mc./sec., and the color subcarrier component may have a frequency of approximately 3.89 mc./sec.

At the receiver position the color video wave may be processed in various manners to adapt the same to the requirements of the image reproducing system. In one arrangement, in which the image reproducing system is in the form of three separate cathode-ray tubes which reproduce the different primary color components of the image, or in which the image reproducing system is in the form of a single tube having three individual electron beams respectively adapted to energize phosphors of different primary color light emission, the color video wave may be separated into its three constituents by a suitable demodulating or sampling system. The three constituents so derived may be combined in a suitable matrix in ratios determined by the particular primary color system used to construct the constituents at the transmitter and thereby converted into three primary color signals conforming to the particular spectral characteristics of the three primary color phosphors of the image reproducer.

In a preferred arrangement the image reproducer is in the form of a cathode-ray tube having a beam-intercepting, image forming screen member comprising stripes of luminescent material energized in consecutive order by a common electron beam source. These stripes are preferably arranged in laterally-displaced color triplets, each triplet comprising three phosphor stripes which respond to electron impingement to produce light of the different primary colors. The order of arrangement of the stripes may be such that the normally horizontally-scanning cathode-ray beam produces red, green and blue light successively at a rate determined by the rate of scanning of the color triplets by the cathode-ray beam. In a typical case this scanning rate of the color triplets may be of the order of seven-million per second.

An image reproducing system of this latter type has the particular advantage that it is unnecessary to demodulate or otherwise separate the color video wave into its three constituents in order to make it suitable for energizing the image reproducer. More particularly, when the rate of scanning the color triplets is equal to the frequency of the subcarrier component, the received video color wave may be applied directly to the image reproducer. When the rate of scanning the color triplets is greater or less than the frequency of the subcarrier component—i. e. when the scanning rate of the color triplets is 7 million per second as above illustrated and the subcarrier component of the received color video wave has a frequency of 3.89 mc./sec.—the video color wave may be readily made to conform to the requirements of the image reproducer by correspondingly modifying the frequency of the subcarrier component to a value of 7 mc./sec., for example in the manner described and claimed in the copending application of R. C. Moore, Serial No. 214,995, filed March 10, 1951.

As a rule the information contained in the color video wave is produced at the transmitter in terms of primary colors which differ from those of the particular real primary colors R, G and B characterizing the phosphor stripes utilized in the image forming screen of the cathode-ray tube. Therefore, it is necessary to modify the received video color wave so that its characteristics conform to the particular real primary colors utilized in the image screen of the tube. This may be achieved without separating the color video wave into its three constituents by appropriately modifying the brightness and the chromaticity subcarrier components of the received color video wave. Several systems for modifying both the brightness component and the chromaticity subcarrier component of the received video wave have been proposed. However, these prior systems have not been satisfactory because of their complexity and because of the careful and time consuming adjustments required to achieve the desired corrections. In view thereof, and since the brightness component may be corrected in a relatively simple manner, it has been proposed to limit the correction to solely the brightness component and to accept the degraded color reproduction brought about in the reproduced image by the absence of a correction for the chromaticity subcarrier component.

It is an object of the invention to provide an improved color television receiving system in which accurate reproduction of the brightness, hue and saturation of the colors of the image are achieved.

A further object of the invention is to produce an improved color television system in which a color video wave, generated on the basis of a given set of color primaries, is adapted to the requirements of an image reproducing system having light producing elements having primary color characteristics different from those of the video wave.

A specific object of the invention is to provide an improved system for modifying both the brightness and the chromaticity components of a color video wave, in which wave the brightness component is in the form of a low frequency signal of extended bandwidth and the chromaticity component is in the form of a modulated subcarrier.

A further object of the invention is to provide a color video wave modifying system characterized by low cost, a high degree of stability and ease of adjustment.

Further objects of the invention will appear as the specification progresses.

The invention is based on the finding that, by suitably modifying certain of the systems heretofore proposed for correcting the brightness component of the color video wave, such systems may be made to provide additionally a signal adapted to bring about a chromaticity subcarrier component correctly matching the characteristics of the image reproducing tube. More particularly, and in accordance with the invention, the foregoing objects are achieved by means of a synchronous detector system which is adapted to simultaneously derive, from the subcarrier component of the color video wave, a first component having low frequency constituents and adapted to modify the brightness component of the color video wave, and a carrier component which is adapted to serve either as a modifying component for the chromaticity component of the received color video wave or as a component for generating a new chromaticity subcarrier of the desired characteristics. In one specific form of the invention, the subcarrier of the received color video wave is applied to a synchronous detector, of the type described below, to produce simultaneously a low frequency signal and a subcarrier signal, the low frequency signal representing the detection products of the applied subcarrier and a synchronous demodulating signal, and the carrier having a frequency and amplitude as determined by the frequency and amplitude of the supplied subcarrier and having a time phase position as established by the relative phases of the applied signals. The so produced low frequency and carrier signals may then be combined in proper amplitude and phase with the received color video wave to modify the brightness and chromaticity subcarrier components thereof and thereby produce a resultant color video wave matching the particular real primary colors of the image reproducer.

In a second specific form of the invention, the subcarrier component of the received video wave is supplied to two channels, each embodying a synchronous detector to be described hereinafter. The detector of the first channel is adapted to produce a first low frequency signal representing the detection products of a demodulating signal and of one of the color signal components of the applied subcarrier of the received color video wave. The detector of the first channel additionally and simultaneously produces a first carrier having a frequency as determined by the frequency of the applied subcarrier and an amplitude as determined by the amplitude of the said one color signal component. The detector of the second channel is similarly adapted to produce a second low frequency signal representing the detection products of a second demodulating signal and of the other of the color signal components of the applied subcarrier. The detector of the second channel additionally and simultaneously produces a second carrier having a frequency as determined by the frequency of the applied subcarrier and an amplitude as determined by the amplitude of the said other color signal component of the applied subcarrier. The first and second low frequency signals so produced may be combined with the brightness component of the received color video wave to produce the desired correction of the brightness information supplied to the image reproducer. In addition, the first and second carriers generated by the modulators may be combined in any desired amplitude ratio and with any desired phase relationship to produce a new subcarrier which, when added to the corrected brightness information, produces a new color video wave matching the particular real primary colors of the image reproducer.

In order to simultaneously produce a low frequency component signal and a carrier signal as set out in the above described specific forms of the invention, the synchronous detectors in accordance with the invention are characterized by the feature that the outputs thereof are reduced substantially to zero when the chromaticity subcarrier supplied to the inputs thereof is zero and by the feature that each of the modulators embodies an output circuit comprising a first impedance system serving as a load for the low frequency signal generated by the detector and a second impedance system serving as a load for the carrier generated by the detector whereby both of these signals are independently and simultaneously generated in output circuit of the detector system.

The invention will be described in greater detail with reference to the appended drawings forming part of the specification and in which.

Figure 1:
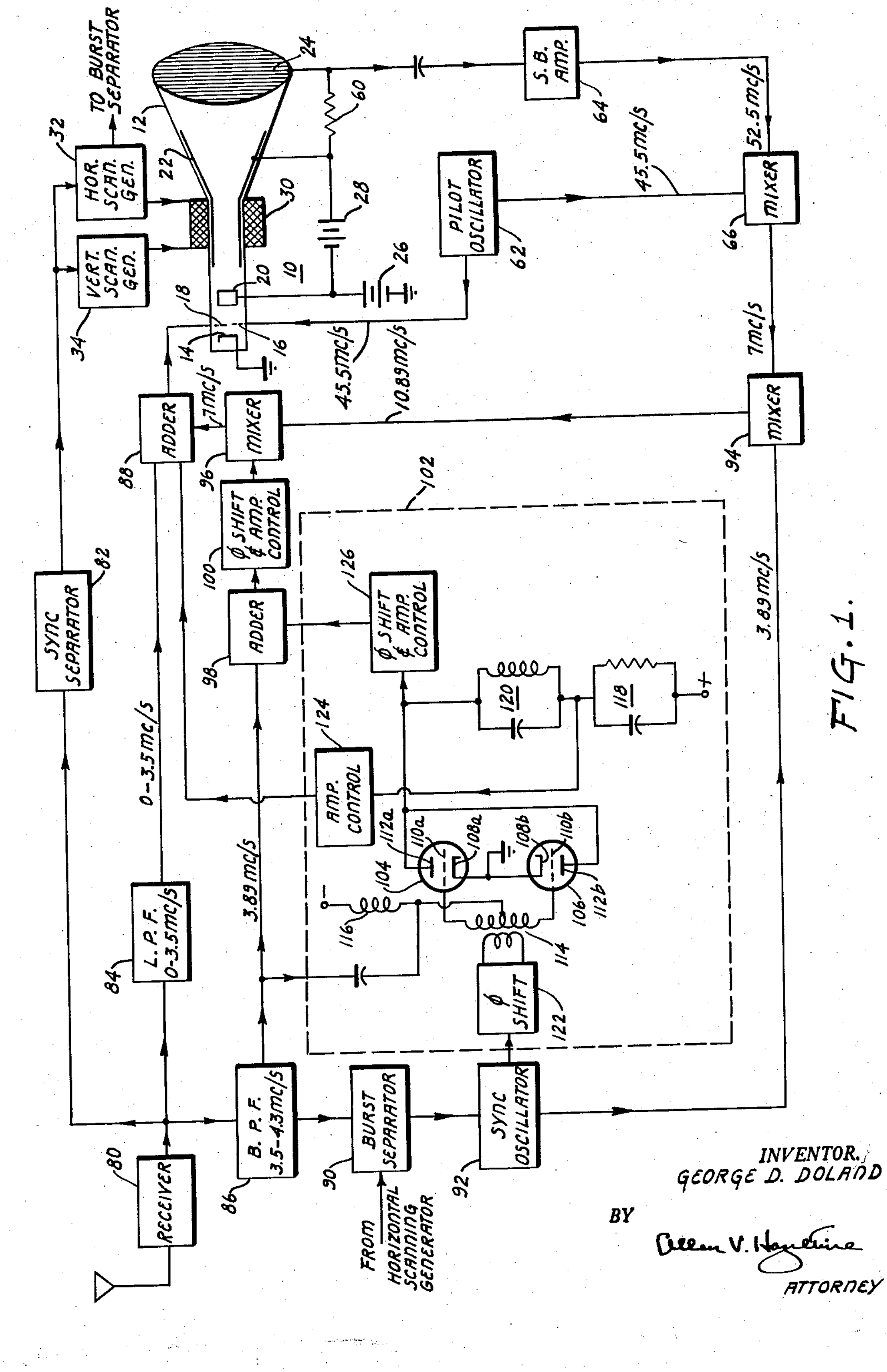
Figure 1 is a block diagram, partly schematic, illustrating one specific form of a color television receiving system in accordance with the invention.

Referring to Figure 1, the color television receiving system there shown, comprises a cathode-ray tube 10 containing, within an evacuated envelope 12, a dual beam generating and intensity control system comprising a cathode 14, control electrodes 16 and 18, a focusing anode 20 and an accelerating anode 22, the latter of which may consist of a conductive coating on the inner wall of the envelope and which terminates at a point spaced from the end face 24 of the tube 10 in conformity with well established practice. Suitable forms of construction for the dual beam generating system have been described in the copending application of M. E. Partin, Serial No. 242,264, filed August 17, 1951, now Patent No. 2,742,531, issued April 17, 1956, and a further description thereof herein is believed to be unnecessary. Electrodes 20 and 22 are maintained at their desired operating potentials by suitable voltage sources shown as batteries 26 and 28, the battery 26 having its positive pole connected to the anode 20 and its negative pole connected to a point at ground potential, and the battery 28 being connected with its positive pole to electrode 22 and its negative pole to the positive pole of battery 26.

A deflection yoke 30 coupled to horizontal and vertical scanning generators 32 and 34 respectively, of conventional design, is provided for deflecting the dual electron beams across the faceplate 24 to form a raster thereon.

Figure 2:
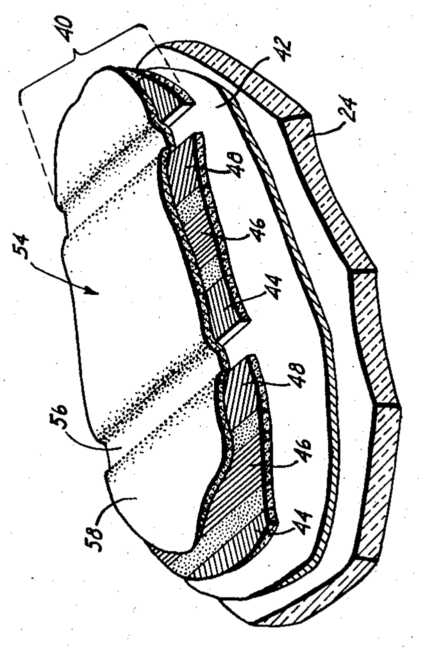
Figure 2 is a perspective view, partly cut away, showing a portion of one form of a beam intercepting structure for a cathode-ray tube image reproducer suitable for use in the system of Figure 1.

The faceplate 24 of the tube 10 is provided with an image forming screen structure, one suitable form of which is shown as 40 in Figure 2. The structure 40 comprises a light transparent electrically conductive coating 42 on the faceplate 24, which coating may be of stannic oxide or of a metal such as silver, having a thickness only sufficient to achieve the desired conductivity. Superimposed on the coating 42 are a plurality of parallelly arranged stripes 44, 46 and 48 of phosphor materials which, upon impingement of the cathode-ray beam, fluoresce to produce light of three different primary colors. For example, the stripe 44 may consist of a phosphor such as zinc phosphate containing manganese as an activator, which upon electron impingement produces red light, the stripe 46 may consist of a phosphor such as zinc orthosilicate, which produces green light, and the stripe 48 may consist of a phosphor such as calcium magnesium silicate containing titanium as an activator, which produces blue light. Other suitable materials which may be used to form the phosphor stripes 44, 46 and 48 are well known to those skilled in the art, as well as methods of applying the same to the faceplate 24, and further details herein concerning the same are believed to be unnecessary.

Each of the groups of stripes may be termed a color triplet, and the sequence of the stripes is repeated in consecutive order over the area of the structure 40.

The structure 40 further serves for producing an indexing signal indicative of the position of the cathode-ray beam on the image screen. For this purpose and in accordance with one arrangement described and claimed in the copending application of William E. Bradley and Meier Sadowsky, Serial No. 313,018, filed October 3, 1952, the phosphor stripes 44, 46 and 48 are arranged in spaced relationship and the spacing between stripes 44—46 and between stripes 46—48 are filled with an electrically insulating material such as unactivated willemite, the said stripes so formed being shown as 50 and 52 respectively. Arranged over the stripes 44, 46, 48, 50 and 52 and in contact with the coating 42 at the spaces between stripes 44—48 is a coating 54 of a material adapted to exhibit different secondary emissive properties as determined by the resistance to electron flow of the underlying layer. Such a material may be magnesium oxide, which, in the construction shown, exhibits at its portions 56 in contact with the conductive layer 42 a secondary electron emissivity different from that exhibited by its portion 58 overlying the stripes 46, 48, 50 and 52.

The beam intercepting structure so constituted is connected to the positive pole of battery 28 through a load impedance 60 (see Figure 1) by means of a suitable connection to the conductive coating 42 thereof.

Since the dual cathode-ray beams produced by the tube 10 are deflected by the common deflection yoke 30, they simultaneously scan the beam intercepting structure 40, and indexing information derived from one of the beams may be used to establish the position of the other beam. When one of the beams, such as the beam under the control of electrode 16 is varied in intensity at a pilot frequency, for example by means of a pilot oscillator 62, the so varied beam will generate across the load resistor 60 an indexing signal comprising a carrier component at the pilot frequency and sideband components representing the sum and difference frequencies of the pilot frequency and the rate at which the indexing stripes are scanned by the beam, as described in the copending application of E. M. Creamer, Jr. et al., Serial No. 240,324, filed August 4, 1951.

In a typical case, the pilot frequency variations of the intensity of the beam may occur at a nominal frequency of 45.5 mc./sec. and, when the rate of scanning the indexing stripe regions 56 of the beam intercepting structure 40 (see Figure 2) is nominally 7 million per second, as determined by the horizontal scanning rate and the number of indexing regions impinged per scanning period, a modulated signal comprising a carrier component at 45.5 mc./sec. and sideband components at 38.5 mc./sec. and 52.5 mc./sec. is produced across load resistor 60. Changes in the rate of scanning the indexing regions due to non-linearities of the beam deflection and/or non-uniformities of the spacing of the indexing regions produce corresponding changes in the frequencies of the sideband components with respect to the frequency of the carrier component, i. e. the sideband components undergo frequency deviations proportional to the variations of the rate of scanning the indexing signal, and accordingly one of these sideband components may be used to supply the desired indexing information.

In the arrangement specifically shown in Figure 1, the upper sideband component at approximately 52.5 mc./sec. is used for supplying the desired indexing information and this sideband component is preferentially selected from the remaining signal components generated across load impedance 60 by means of a sideband amplifier 64 having a restricted pass band characteristic centered about this nominal frequency value. Amplifier 64 may be of conventional form and may be made to exhibit a restricted pass band characteristic in any well known manner, for example by means of a resonant circuit broadly tuned to the nominal frequency of the desired sideband or by an equivalent filter system.

By synchronously detecting the output of amplifier 64 by means of a heterodyne mixer 66, to which is also supplied a signal from the pilot oscillator 62, there is produced an output signal having a nominal frequency of 7 mc./sec. and having frequency variations as determined by variations of the rate of scanning the indexing regions of the image screen structure. This output signal may be used for controlling the time phase position of color image information supplied to the tube 10 as later to be more fully pointed out. Mixer 66 may be of conventional form and may consist of a dual grid thermionic tube to the different grids of which the two input signals are supplied.

A cathode-ray image producing system of the type above described has the particular advantage that the color image information supplied thereto may be in the form of a wave having a low frequency component of relatively wide band-width and having a second component in the form of an amplitude and phase modulated subcarrier, which components in combination establish the degree to which the consecutively scanned phosphor stripes are to be energized. Such a color video wave has the same form as the color video wave produced by the transmitter. As above pointed out, the transmitter wave may be characterized by a chromaticity subcarrier having a frequency which is different from that of the wave to be supplied to the image reproducer, and the transmitter wave may be generated in terms of primary colors which differ from those of the primary colors characterizing the phosphor strips of the image reproducer. However, the transmitter wave may be adapted to the requirements of the image reproducing tube by appropriately modifying the frequency of the subcarrier of the received transmitter wave and the color defining characteristics of its component signals.

For supplying a color video wave conforming to the requirements of the tube 10, the system shown in Figure 1 comprises a receiver 80 which may be of conventional design and include the usual radio frequency amplifier, frequency conversion and detector stages for deriving the color video signal produced at the transmitter.

In a typical form, the received color video signal comprises time-spaced horizontal and vertical synchronizing pulses which recur at the horizontal and vertical scanning frequencies, and the color video wave which occurs in the intervals between the horizontal pulses. The incoming video signal may further include a marker signal for providing a phase reference for the color establishing component of the color video wave, such a marker being usually in the form of a burst of a small number of cycles of carrier signal having a frequency equal to the frequency of the chromaticity subcarrier of the video wave and occurring during the so-called back porch interval of the horizontal scanning pulses.

The synchronizing pulses contained in the received video signal are selected by a sync signal separator 82 of conventional form and subsequently energize, in well known manner, the horizontal and vertical scanning generators 32 and 34.

The video color wave, which may be generated at the transmitter in any of the manners previously described, is separated into its two components by means of a low pass filter 84 and a bandpass filter 86, whereby, at the output of filter 84, there is derived the low frequency component of the video wave containing the brightness information of the image elements and at the output of the filter 86 there is derived the marker signal and the modulated subcarrier component of the video wave indicative of the chromaticity information of the image elements. The frequency pass bands of the filters 84 and 86 are selected in conformity with the standards of the transmission system, typical values for the pass bands of filters 84 and 86 being 0 to 3.5 mc./sec. for filter 84 and 3.5 to 4.3 mc./sec. for filter 86 when a subcarrier frequency of approximately 3.89 mc./sec. is used at the transmitter.

The brightness signal is supplied to the control grid 18 of the tube 10 through an adder 88 having a plurality of inputs and a common output and consisting, in a typical case, of a plurality of thermionic tubes, the input grid circuits of which are separately energized by the respective input signals applied to the adder, and the output anode circuits of which are supplied through a common load impedance.

The marker signal is separated from the video wave by means of a gated path operated in synchronism with the occurrence of the marker signal. For this purpose, there is provided a burst separator 90 consisting, for example, of a dual grid thermionic tube having one control grid which is coupled to the output of the bandpass filter 86 and a second control grid so negatively biased as normally to prevent conduction through the tube. The tube is made conductive at the proper instant, i. e. during the back porch interval of the horizontal synchronizing pulses, by means of a positive pulse which may be derived from the output of the horizontal scanning generator 32 in well known manner and which is applied to the said second control grid to override the normal blocking bias. The burst separator may also contain a filter for attenuating undesirable signals at the output thereof, i. e. the separator may contain a resonant circuit which is tuned to the frequency of the marker signal and which is connected to the anode of the tube. Alternatively, the burst separator may be of the form described and claimed in the copending application of Clem H. Phillips, Serial No. 345,307, filed March 30, 1953.

The marker signal so provided is applied to an oscillator 92 which is adapted to generate a reference signal having a frequency and a phase position as established by the frequency and phase position of the marker signal applied to the input thereof. In a suitable form the oscillator 92 may be of the type described in the copending application of Joseph C. Tellier, Serial No. 197,551, filed November 25, 1950, now Patent No. 2,740,046 issued March 27, 1956.

The chromaticity information contained on the 3.89 mc./sec. subcarrier component of the received color video wave, and modified as hereinafter to be described, is supplied to the electrode 18 of the tube 10 at a frequency of 7 mc./sec. and in proper phase as determined by the marker reference signal derived from the oscillator 92 and by the indexing information derived from the mixer 66. For this purpose there are provided a heterodyne mixer 94 having one input supplied by the oscillator 92 and a second input supplied by the mixer 66, and a second mixer 96 which has one input circuit supplied by the bandpass filter 86 through an adder 98 and a phase shift amplitude control 100, a second input circuit supplied by the mixer 94 and an output circuit coupled to a second input circuit of the adder 88. The heterodyne mixers 94 and 96 may be of conventional form and may each consist of a dual grid thermionic tube, to the different grids of which the two input signals are supplied. The mixers may also contain an output circuit broadly tuned to the frequency of the desired output signal, whereby the desired heterodyne frequency signal may be preferentially selected. The adder 98 may be similar in form to adder 88 and the phase shifter and amplitude control 100 may be of conventional form—i. e. the latter may consist of a delay line of appropriate length the output of which is coupled to an attenuator matching the impedance characteristic of the delay line.

The system operates to combine the marker reference signal at 3.89 mc./sec. with the indexing signal at a nominal frequency of 7 mc./sec. to produce a first heterodyne signal at a frequency of approximately 10.89 mc./sec. This heterodyne signal, it will be noted, exhibits, about a fixed phase reference established by the marker reference signal, the frequency variations determined by variations of the scanning rate of the indexing regions of beam intercepting of the tube 10.

By means of the mixer 96 this heterodyne signal is in turn combined with the chromaticity information at 3.89 mc./sec. appearing at the output of the phase shifter and amplitude control 100 to produce a second heterodyne signal at 7 mc./sec., which signal exhibits the phase and amplitude variations of the chromaticity signal and the frequency variations established by the variations of the scanning rate of the indexing regions and hence of the color triplets of the screen, these variations being established with reference to a given time phase position as determined by the color marker signal energizing the oscillator 92.

As previously pointed out, the color image information contained in the received color video wave is generated at the transmitter in terms of primary colors which are different from the primary colors characterizing the phosphor materials constituting the color triplets of the image screen of the tube 10. However, the incoming color video wave may be adapted to conform to the requirements of the image reproducing tube by suitably modifying the low frequency component and the subcarrier component of the received video wave. In accordance with the invention, this modification of the incoming color video wave is achieved by a synchronous detector system adapted to produce simultaneously, a low frequency correction signal for modifying the extended bandwidth component of the incoming video wave and a subcarrier correction signal adapted to modify the subcarrier component of the incoming color video wave. More particularly, and as shown in Figure 1, there is provided a synchronous detector system 102 comprising two tubes 104 and 106 having respectively cathodes **108*a* and 108*b*, control grids 110*a* and 110*b* and anodes 112*a* and 112*b*. The cathodes are connected in common to a point at ground potential. Control grids 110*a* and 110*b* are connected to the opposite ends of the secondary winding of a transformer 114 and are supplied with an operating bias voltage from a suitable source (not shown) through an inductance 116 connected to a center tapping of the secondary winding of transformer 114. The anodes 112*a* and 112*b* are connected in common and supplied from a source of positive potential (not shown) through a dual load impedance constituted by a high-pass resistance capacitance network 118 and a capacitance-inductance network 120** having a resonant frequency substantially equal to the frequency of the subcarrier to be processed.

The control grids **110*a* and 110*b* are energized in phase opposition by a signal which is derived from the oscillator 92 through a phase shifter 122 and is applied to the primary winding of the transformer 114. The control grids are further energized in the same phase by the subcarrier to be processed; this being effected by coupling the output of the bandpass filter 86 to the center tapping of the secondary winding of transformer 114. Inductance 116 should exhibit sufficient impedance at the frequency of the applied signal so as to avoid undue loading of the signal circuits of the bandpass filter 86**.

In the operation of the synchronous detector system 102 there will be produced, at the common connected anodes **112*a* and 112*b*, intermodulation products of the chromaticity subcarrier at 3.89 mc./sec. derived from the bandpass filter 86 and the signal at 3.89 mc./sec. derived from the oscillator 92. These intermodulation products include a "D.-C." component having amplitude variations with phase and magnitude as established by the relative phase of the two input signals and the amplitude of the input subcarrier. This "D.-C." component appears across the network 118 and may be applied as a monochrome correction signal for the color video wave by supplying the same through an amplitude control 124 as a third input to the adder 88. The amount of the monochrome correction signal to be added to the signal applied to tube 10 will be determined by the actual make-up of the color video wave derived by the receiver 80 and by the particular primary colors characterizing the phosphors of the cathode-ray tube 10. As will be apparent to those skilled in the art, the required amount of the monochrome correction signal may be readily calculated and its character and amplitude may be adjusted by means of the phase shifter 122 and the amplitude control 124**.

In addition to the "D.-C." component above referred to, there is simultaneously generated at the common anodes **112*a* and 112*b* a signal at 3.89 mc./sec., which signal has an amplitude as determined by the amplitude of the chromaticity signal applied by the bandpass filter 86 and a phase as determined by the relative phase of the input signals. This signal is preferentially selected by the parallel resonant network 120 and is added to the subcarrier component of the received color video wave by supplying the same as a second input to the adder 98 through a phase shifter and amplitude control 126**.

The addition of the two signals at the same frequency in the adder 98 brings about a resultant signal having amplitude and phase values as determined by the amplitude and phase values of the input signals. Therefore, by adjusting the phase and amplitude of the signal produced across the network 120, a desired correction factor may be imparted to the signal supplied to the adder 98 from the bandpass filter 86. In addition, it may be desirable to adjust the phase and amplitude of the output signal of adder 98 and this may be achieved by means of the phase shifter and amplitude control 100.

While in the arrangement shown in Figure 1 the chromaticity subcarrier component of the received video color wave is modified to produce a resultant subcarrier conforming to the requirements of the image reproducing tube, in some instances it may be desirable to reconstruct at the receiver a chromaticity subcarrier having the required characteristics. This may be achieved, utilizing the novel synchronous detection system of the invention, as shown in the specific arrangement illustrated in Figure 2.

Figure 3:
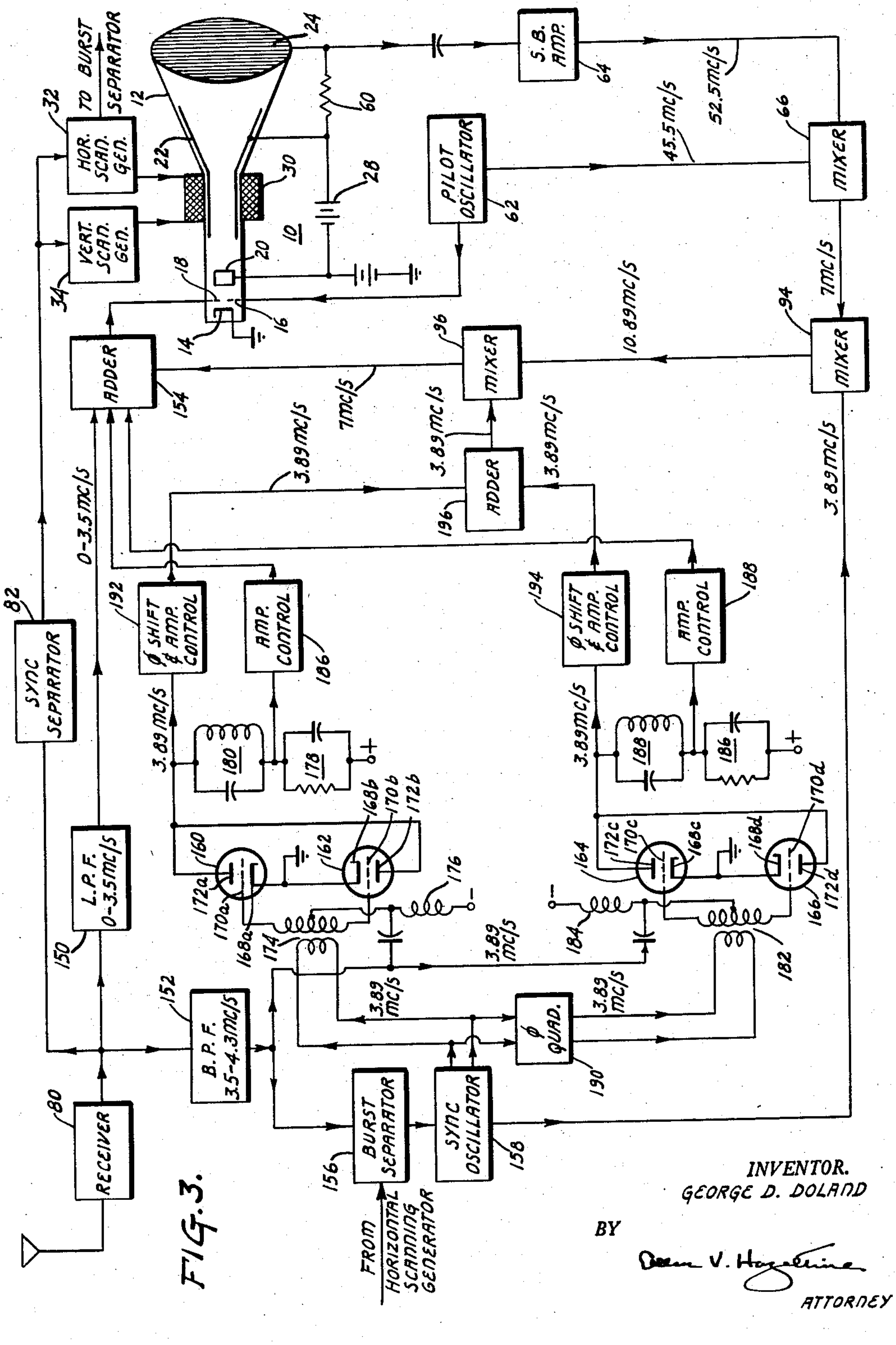
Figure 3 is a block diagram, partly schematic, illustrating a second specific form of a color television receiving system in accordance with the invention.

In the arrangement shown in Figure 3 the received color video wave derived from the receiver 80 is separated into its low frequency brightness component by a low pass filter 150 and its chromaticity subcarrier component by means of a bandpass filter 152. The filters 150 and 152 may be similar to the filters 84 and 86 of the system of Figure 1.

The brightness signal at the output of low pass filter 150 is supplied as one input to an adder 154 corresponding to and constructed similarly to the adder 88 of Figure 1.

The output of bandpass filter 152 is coupled to a burst separator 156 which in turn energizes a synchronized oscillator 158 to produce a signal at 3.89 mc./sec. having a phase reference position indicative of the phase reference position of the chromaticity subcarrier of the received color video wave. The separator 156 and oscillator 158 correspond respectively to the separator 90 and oscillator 92 of Figure 1 and function in the same manner.

The chromaticity subcarrier appearing at the output of filter 152 and the color phase reference signal produced by oscillator 158 are supplied to a synchronous detection system comprising triodes 160, 162, 164 and 166. Triodes 160 and 162 are arranged in a pair and comprise cathodes 168*a* and 168*b* connected in common to a point at ground potential, control grids 170*a* and 170*b* connected to opposite ends of the secondary winding of a transformer 174, and anodes 172*a* and 172*b* connected in common.

The control grids 170*a* and 170*b* are supplied with an operating bias from a source (not shown) coupled to the grids through a high impedance inductance 176 connected to a center tapping of the secondary winding of transformer 174, whereas the common anodes 172*a* and 172*b* are supplied from a positive potential source (not shown) through a dual load impedance comprising a high pass resistance-capacitance network 178 and a capacitance-inductance network 180 which is broadly resonant at the frequency of the subcarrier.

The triodes 164 and 166 are similarly arranged in a pair, the control grids 170*c* and 170*d* thereof being connected to the ends of the secondary winding of a transformer 182 and being supplied with an operating bias from a potential source (not shown) through a high impedance inductance 184 connected to a center tap of the secondary winding. The anodes 172*c* and 172*d* are connected in common and supplied with an operating potential from a positive voltage source (not shown) through a dual load impedance comprising a high pass resistance-capacitance network 186 and a capacitance-inductance network 188 which is broadly resonant at the frequency of the subcarrier.

In operation, the control grids of tubes 160 and 162 are energized in phase opposition by the reference signal which is derived from the oscillator 158 and is applied to the primary of transformer 174. The grid electrodes are additionally energized in the same phase sense by the chromaticity subcarrier which derived from the bandpass filter 152 is coupled as shown to the center tapping of the secondary of transformer 174. The synchronous detection of the subcarrier in the phase of the reference signal produces, at the common anodes of the tubes 160 and 162, intermodulation products, one of which consists of a D.-C. component having amplitude variations as determined by the amplitude variations of that amplitude modulated carrier component of the supplied subcarrier which is in phase with the reference signal. This D.-C. component appears across the network 178 and may be applied as a first correction signal for thhe brightness component of the received video wave by supplying the same through an amplitude control 186 as a second input to the adder 154.

At the same time, and by reason of the load impedance network 180 coupled to the anodes of tubes 160 and 162, there is produced a signal at 3.89 mc./sec. having amplitude variations determined by the amplitude variations of that component of the input subcarrier which is in phase with the reference signal derived from oscillator 158. This amplitude modulated 3.89 signal serves as one constituent of the chromaticity sub-carrier to be reconstructed.

A similar processing of the subcarrier derived from the bandpass filter 152 takes place in the synchronous detector comprising the triodes 164 and 166. More particularly, the grids of these triodes are energized in phase opposition by the reference signal which is derived from the oscillator 158 and is applied to the primary of transformer 182, and the grids are further energized in the same phase sense by the subcarrier from the filter 152 which is supplied to the center tapping of the secondary of transformer 182. In this latter instance, however, the reference signal is supplied to the triodes 164 and 166 in phase quadrature to the reference signal supplied to the triodes 160 and 162. Accordingly there is produced at the anodes of tubes 164 and 166 intermodulation products, one of which consists of a D.-C. component having amplitude variations as determined by the amplitude variations of the second of the components making up the supplied subcarrier. This D.-C. component appears across the network 186 and may be applied as a second correction signal for the brightness component of the received video wave by supplying the same through an amplitude control 188 as a third input to the adder 54.

By means of the load impedance 188 contained in their anode circuit, the tubes 164 and 166 are also made to produce a signal at 3.89 mc./sec. having amplitude variations determined by the amplitude variations of the second of the components which make up the supplied subcarrier and which is in phase quadrature with the reference signal from the oscillator 158. This amplitude modulated 3.89 mc./sec. signal serves as the second constituent of the chromaticity subcarrier to be reconstructed.

For supplying the reference signal to the tubes 164 and 166 in quadrature to the reference signal supplied to the tubes 160 and 162, there is provided a phase quadrature network 190 which is interposed between the oscillator 158 and the primary of transformer 182 as shown. This network may be of any conventional form—i. e. it may consist of a quadrature transformer made up of resonant primary and secondary windings or may consist of a delay line of appropriate length.

The amplitude modulated signals at a frequency of 3.89 mc./sec., produced across load impedances 180 and 188, may be combined in any desired amplitude and phase relationships to produce a resultant subcarrier at 3.89 mc./sec. conforming to the spectral requirements of the image reproducing tube. For this purpose there are provided a phase shifter and amplitude control 192 coupled to the network 180, a phase shifter and amplitude control 194 coupled to the network 188, and an adder 196 to which the outputs of the controls 192 and 194 are supplied. The resultant signal produced at the output of adder 196 may be converted to a 7 mc./sec. signal as required by the image reproducing tube by a frequency conversion system identical to that shown in Figure 1.

More particularly, as in the case of the system of Figure 1, the output of the reference signal oscillator 158 is combined in a mixer 94 with indexing information derived from the screen of tube 10 and appearing at the output of mixer 66. The action of the mixer 94 is to produce a first heterodyne signal at a nominal frequency of 10.89 mc./sec. having a phase reference as established by the reference signal derived from the oscillator 158 and having frequency variations as established by the indexing information derived from the mixer 66. The 10.89 mc./sec. signal so produced is combined in the heterodyne mixer 96 with the output of adder 196 to produce a chromaticity subcarrier at 7 mc./sec. which has the chromaticity information of the color subcarrier reconstructed as above described, and which is supplied as a fourth input to the adder 154 energizing the beam intensity control electrode of the image reproducing tube 10.

Figure 4:
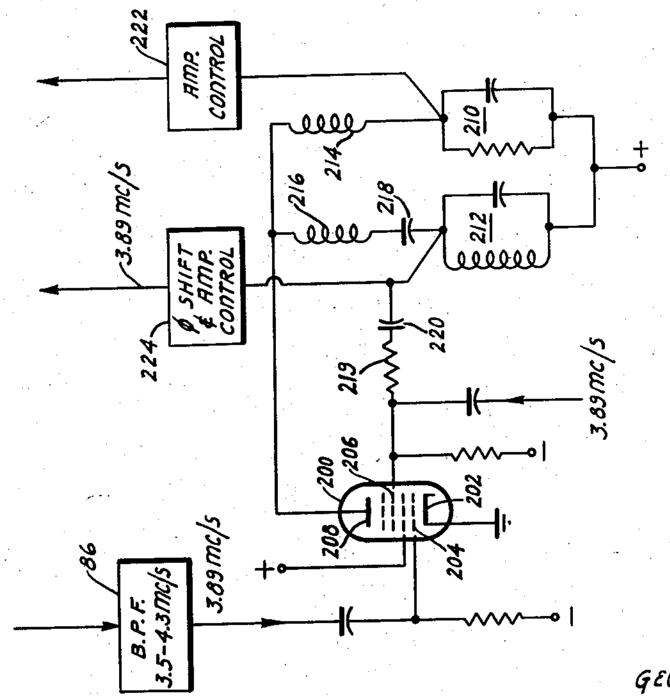
Figure 4 is a schematic diagram illustrating a second form of a synchronous detector suitable for the receiving systems shown in Figures 1 and 3.

While, in the specific forms of the invention shown in Figures 1 and 3, the synchronous detector systems each comprise two triodes arranged in balanced relationship so as to produce an output signal proportional to the amplitude of the supplied chromaticity subcarrier, other forms of synchronous detectors may also be used. For example, the triodes may be substituted by diode elements energized in the same manner as the triodes illustrated. In another form, the synchronous detectors may each consist of a multigrid tube system which produces simultaneously a D.-C. correction signal and an output subcarrier signal having an amplitude as determined by the amplitude of an input subcarrier signal. Such an alternative form of synchronous detector is shown in Figure 4 wherein the detector comprises a multigrid tube 200 having a cathode 202, first and second input control grids 204 and 206 respectively, and an anode 208. The tube 200 may additionally comprise one or more screening grids arranged between the input control grids, and a suppressor grid arranged adjacent to the anode. The output circuit of the tube 200 is provided with a resistance-capacitance high pass network 210 serving as a load impedance for the low frequency components generated by the detector system, and a capacitance-inductance network 212 which is broadly resonant to the frequency of the supplied subcarrier signal and serves as a load impedance for the signal components at the subcarrier frequency produced by the detector system. Anode potential for operating the tube 200 may be supplied from a suitable source (not shown) connected to the free ends of the networks 210 and 212, a conductive path for the anode current being supplied by the network 210. Since the networks 210 and 212 are arranged in shunt relationship, it is desirable to avoid the mutual loading thus normally brought about. This may be achieved by means of a high impedance inductance 214 connected in series with the network 210 so that only the desired D.-C. component appears across the network 210, and by means of a series resonant circuit made up of inductance 216 and capacitance 218 which presents a high impedance to all signal components except the signal at the subcarrier frequency so that only the signal at the subcarrier frequency appears across the network 212.

When the detector is used in a receiver of the type shown in Figure 1, the grid 204 is supplied with the chromaticity subcarrier of the received color video wave as derived from the bandpass filter 86 of Figure 1 and the grid 206 is supplied with a signal at the frequency of the subcarrier as derived for example from the oscillator 92 and the phase shifter 122 of Figure 1. When the detector is used in a receiver of the type shown in Figure 3, the grid 204 is supplied with the chromaticity subcarrier—derived from the bandpass filter 152 and the grid 206 is supplied with a signal as derived from the oscillator 158 either in the same phase or in phase quadrature with the reference signal in the same manner as in the case of the modulators 160—162 and 160—164 of Figure 3.

The mixer system so far described will normally produce a signal at the subcarrier frequency due to the presence of the signal on grid 206 even in the absence of a chromaticity signal on grid 204. In order to convert the mixer system to a balanced detection system wherein the output signal is determined by the amplitude of the input subcarrier signal—i. e. becomes zero in value when the input chromaticity subcarrier is zero—there is provided a balancing network comprising a resistor 219 and a capacitor 220 connected in series relationship between the high potential end of the load impedance 212 and the grid 206. By appropriately adjusting the impedance of the network 219—220, the output signal at network 212 may be made independent of the amplitude of the signal supplied to grid 206 thereby effecting a balanced detection system. When the detector of Figure 4 is used as a substitute for the detector shown in Figure 1, the D.-C. correction signal appearing across network 210 is supplied through an amplitude control 222 to the adder 88, and the chromaticity correction signal appearing across the network 212 is supplied through a phase shifter and amplitude control 224 to the adder 98.

Similarly, when the detector of Figure 4 is used to replace each of the detectors 160—162 and 164—166 of the system of Figure 3, the two D.-C. correction signals thus produced are supplied to the adder 154, whereas the two carrier signals thus produced are combined in the adder 196 to reconstruct a new subcarrier chromaticity signal conforming to the spectral requirements of the image reproducing tube, which is then supplied to the mixer 96.

It will be apparent to those skilled in the art that the subcarrier bearing the chromaticity information need not be processed at the frequency at which it appears at the output of the receiver 80 but may be processed at any frequency convenient to the design of the receiver system—i. e. in those receiver systems in which the chromaticity information is heterodyned to a frequency other than the received subcarrier frequency for convenience in circuit design, the processing of the subcarrier chromaticity signal may be effected at such other frequencies by appropriately modifying the frequency of the reference signal serving as the synchronous detection signal which is applied to the detectors.

While I have described my invention by means of specific examples and in specific embodiments I do not wish to be limited thereto for obvious modifications will occur to those skilled in the art without departing from the spirit and scope of the invention.

What I claim is:

1. A color television receiving system for a color video wave comprising a first signal component having an extended bandwidth and definitive of the brightness of the elements of a televised image and comprising a second signal component in the form of a modulated subcarrier defining with said first signal component the chromaticity of said elements, the image information contained in said video color wave being established in terms of a given primary color system; said receiving system comprising means for modifying said color video wave thereby to establish said image information in terms of a primary color system different from the said given primary color system, said latter means comprising, means for deriving from said color video wave a first wave definitive of the brightness of said image elements, means for deriving from said color video wave a second wave in the form of a modulated subcarrier having variations indicative of at least one chromaticity aspect of the colors of said image elements, means for simultaneously deriving from said second component of said color video wave a low frequency component signal and a subcarrier component signal, said latter means comprising a synchronous detector system having an input circuit and an output circuit, said output circuit comprising a first network constituting a load impedance for signals at the frequency of said low frequency component signal and a second network constituting a load impedance for signals at the frequency of said subcarrier component signal, means for applying said second component of said color video wave to the input circuit of said detector system, means coupled to said first network for deriving said low frequency component signal and for combining the same with said first signal component of said color video wave, and means coupled to said second network for deriving said subcarrier component signal and for combining the same with said second wave.

2. A color television receiving system as claimed in claim 1, wherein said second wave deriving means comprises means for deriving from said color video wave a wave in the form of a subcarrier having phase and amplitude variations indicative of two chromaticity aspects of the colors of said image elements.

3. A color television receiving system as claimed in claim 1, wherein said second wave deriving means comprises means for deriving from said color video wave a subcarrier having amplitude variations indicative of variations of the intensity of one color component of said image elements.

4. A color television system as claimed in claim 1 wherein said load impedance for signals at the frequency of said low frequency component signal comprises a high-pass network, and wherein said load impedance for signals at the frequency of said subcarrier component signal comprises a network resonant to the frequency of said subcarrier component signal.

5. A color television system as claimed in claim 1 wherein said means for simultaneously deriving said low frequency component signal and said subcarrier component signal comprises two modulation elements having input and output electrodes, means for energizing said input electrodes in the same phase sense with said second component of said color video wave, means for energizing said input electrodes in phase opposition with a reference signal having a frequency equal to the frequency of said second component of said color video wave, wherein said output electrodes are connected in common, and wherein said first and second networks are coupled to said common connected output electrodes.

6. A color television system as claimed in claim 5 wherein said load impedance for signals at the frequency of said low frequency component signal comprises a high pass network, and wherein said load impedance for signals at the frequency of said subcarrier component signal comprises a network resonant at the frequency of said subcarrier component signal.

7. A color television receiving system for a color video wave comprising a first signal component having an extended bandwidth and definitive of the brightness of the elements of a televised image and comprising a second signal component in the form of a modulated subcarrier defining with said first component the chromaticity of said elements, the image information contained in said video color wave being established in terms of a given primary color system; said receiving system comprising means for modifying said color video wave thereby to establish said image information in terms of a primary color system different from the said given primary color system, said latter means comprising means for deriving from said color video wave a first wave definitive of the brightness of said image elements, means for deriving from said color video wave a second wave in the form of a subcarrier having phase and amplitude variations indicative of two chromaticity aspects of the colors of said image elements, two modulation elements having input and output electrodes, means for supplying said second component of said color video wave in the same phase sense to said input electrodes, means for supplying a reference signal having the frequency of said last mentioned second component in phase opposition to said input electrodes, said output electrodes being connected in common, a first network constituting a load impedance for low frequency signals, a second network constituting a load impedance for signals having a frequency equal to the frequency of said last mentioned second component, means coupling said first and second networks to said common connected output electrodes thereby to produce simultaneously a low frequency component signal and a subcarrier component signal, said last mentioned component signals having variations as determined by variations of said second component of said color video wave and said reference signal supplied to said input electrodes, means coupled to said first network for deriving said low frequency component signal and for combining the same with the said first signal component of said color video wave thereby to produce a modified low frequency component signal, and means coupled to said second network for deriving said subcarrier component signal and for combining the same with said second wave thereby to produce a modified subcarrier wave.

8. A color television receiving system as claimed in claim 7 further comprising means for varying the phase position of said modified subcarrier wave, and means for combining said modified subcarrier wave with said modified low frequency component signal.

9. A color television receiving system for a color video wave comprising a first signal component having an extended bandwidth and definitive of the brightness of the elements of a televised image and comprising a second signal component in the form of a modulated subcarrier defining with said first component the chromaticity of said elements, the image information in said video color wave being established in terms of a given primary color system; said receiving system comprising means for deriving from said color video wave a first wave definitive of the brightness of said image elements, a first pair of modulation elements having input and output electrodes, means for supplying said second component of said color video wave in the same phase sense to said input electrodes, means for supplying a first reference signal of a given phase and having the frequency of said last mentioned second component in phase opposition to said input electrodes, said output electrodes being connected in common, a first network constituting a load impedance for low frequency signals, a second network constituting a load impedance for signals having a frequency equal to the frequency of said last mentioned second component, means coupling said first and second networks to said common connected output electrodes thereby to produce simultaneously a first low frequency component signal and a first subcarrier component signal, said last mentioned signals having variations as determined by variations of said second component of said color video wave and of said first reference signal supplied to said input electrodes, a second pair of modulation elements having input and output electrodes, means for supplying said second component of said color video wave in the same phase sense to said input electrodes, means for supplying to said input electrodes in phase opposition a second reference signal having a phase in quadrature to the phase of said first reference signal and having the frequency of said last named second component, the output electrodes of last named elements being connected in common, a third network constituting a load impedance for low frequency signals, a fourth network constituting a load impedance for signals having a frequency equal to the frequency of said second component of said color video wave, means coupling said third and fourth networks to said last mentioned common connected output electrodes thereby to produce simultaneously a second low frequency component signal and a second subcarrier component signal, said last mentioned signals having variations as determined by variations of said second component of said color video wave and of said second reference signal supplied to said input electrodes, means for combining said first and second low frequency component signals and said derived first wave definitive of the brightness of said image elements thereby to produce a resultant low frequency signal, and means for combining said first and second subcarrier component signals to produce a resultant subcarrier signal.

10. A color television receiving system as claimed in claim 9 further comprising means for varying the phase position of one of said subcarrier component signals, and means for combining said resultant subcarrier signal and said resultant low frequency signal thereby to produce a color video wave having image information established in terms of a primary color system different from the given primary color system of said received color video wave.

References Cited in the file of this patent

UNITED STATES PATENTS

| | | |
|---|---|---|
| 2,635,140 | Dome | Apr. 14, 1953 |
| 2,667,534 | Creamer et al. | Jan. 26, 1954 |
| 2,725,421 | Valdes | Nov. 29, 1955 |

FOREIGN PATENTS

| | | |
|---|---|---|
| 683,926 | Great Britain | Dec. 10, 1952 |